D. C. DAVIS.
EXCITING SYSTEM FOR COMMUTATING POLES IN DYNAMO ELECTRIC MACHINERY.
APPLICATION FILED FEB. 8, 1918.

1,357,227.

Patented Nov. 2, 1920.

WITNESSES:
J. T. Wurmb
F. A. Lind

INVENTOR
David C. Davis
BY
Wesley G. Carr
ATTORNEY

UNITED STATES PATENT OFFICE.

DAVID C. DAVIS, OF WILKINSBURG, PENNSYLVANIA, ASSIGNOR TO WESTINGHOUSE ELECTRIC AND MANUFACTURING COMPANY, A CORPORATION OF PENNSYLVANIA.

EXCITING SYSTEM FOR COMMUTATING-POLES IN DYNAMO-ELECTRIC MACHINERY.

1,357,227.   Specification of Letters Patent.   Patented Nov. 2, 1920.

Application filed February 8, 1918. Serial No. 216,089.

*To all whom it may concern:*

Be it known that I, DAVID C. DAVIS, a citizen of the United States, and a resident of Wilkinsburg, in the county of Allegheny and State of Pennsylvania, have invented a new and useful Improvement in Exciting Systems for Commutating-Poles in Dynamo-Electric Machinery, of which the following is a specification.

My invention relates to systems of control for the commutating poles of dynamo-electric machinery of the commutating type, and it has for its object to provide a system of the character designated that shall be simple and effective in operation and operable to produce satisfactory commutation over wide ranges of change in the armature reaction of said dynamo-electric machine.

Figure 1:
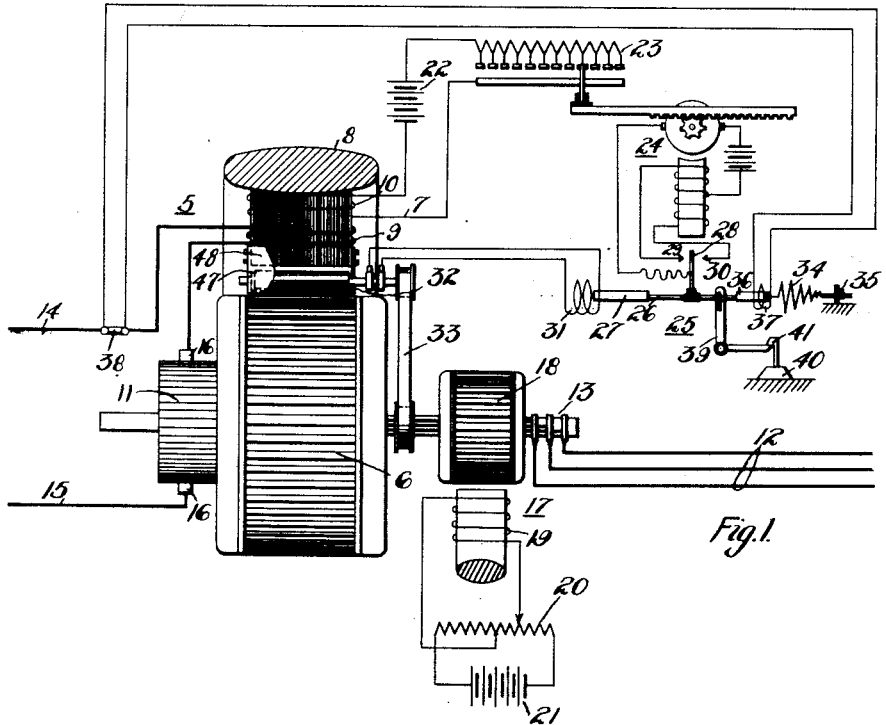
Figure 2:
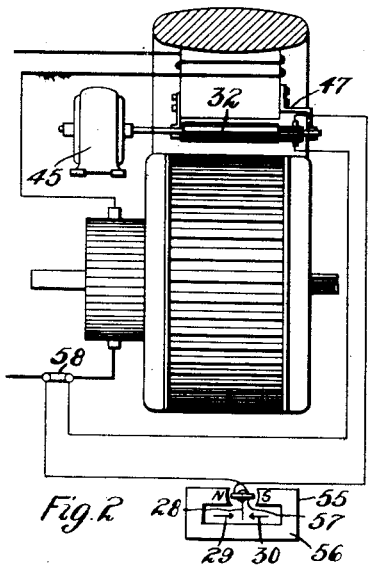
Figure 3:
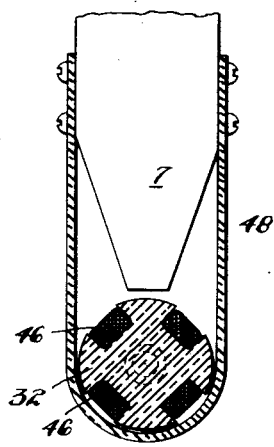
Figure 4:
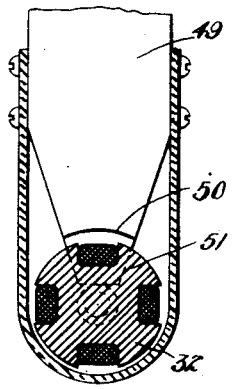

In the accompanying drawing, Figure 1 is a diagrammatic view of a dynamo- electric machine of the commutator type, together with appropriate load and supply circuits and auxiliary control apparatus, constructed and arranged in accordance with one form of my invention; Fig. 2 is a diagrammatic view of a portion of a system similar to that shown in Fig. 1 but embodying a modified form of my invention; and Figs. 3 and 4 are detail sectional views of an auxiliary dynamo-electric machine mechanism employed as an essential element in my system.

It is well known that the flow of load current in the armature of a dynamo-electric machine produces an armature-reaction field which is cut by the short circuited armature coils undergoing commutation, producing a rotational electromotive force which may give rise to serious sparking at the brushes. It has been proposed to minimize this effect by providing commutating poles, or other equivalent means, whereby a stator magnetomotive force is produced substantially equal and opposite to the magnetomotive force of armature reaction, enabling ready control of the field strength in the commutating zone.

It is undesirable to have no magnetic field whatsoever in the commutating zone, as it tends to promote sparkless commutation to have the magnetomotive force of the commutating pole slightly proponderate over that of armature reaction so that a small electromotive force may be generated in the short-circuited armature coils undergoing commutation sufficient to establish current reversal therein during the commutating period.

In the ordinary generator or motor, the desired commutating-pole magnetomotive force may be generally produced with sufficient closeness by a single exciting winding energized in accordance with the load current. In other forms of machinery, however, such, for example, as the booster-type rotary converter, there are secondary reactions arising within the armature the effect of which cannot be compensated for by a series-type commutating winding, and it is in the compensation for these secondary reactions that my system has particular utility.

Taking the specific case of a booster-type rotary converter, it is known that the normal reaction under the brush is a generator reaction, as pointed out, for example, in an article by B. G. Lamme and F. D. Newbury, appearing on page 1625 *et seq.* of the *Proceedings of the American Institute of Electrical Engineers* for 1910. The booster machine, in apparatus of this type, is generally mechanically coupled to the converter armature and, therefore, when boosting, the booster armature is driven as a generator, deriving its driving torque from the converter armature and establishing motor reaction in the latter which tends to neutralize the normal generator reaction under the brushes, necessitating a weakening of the energization of the commutating-pole exciting windings with an increasing degree of boost, said effect being partially independent of changes in the load current. Conversely, during bucking operation, the booster machine operates as a motor, driving the armature of a rotary converter as a generator and increasing the normal generator reaction under the brushes, necessitating an increase in the excitation of the commutating pole.

In order to properly compensate for the foregoing secondary armature reactions, I mount a rotating armature under the commutating pole of a machine of the character designated, providing suitable driving means therefor. The armature thus develops an electromotive force that is proportional to the resulting magnetic field in the commutating zone. Said electromotive force is caused to energize an electro-responsive device, mounted to oppose a spring element and arranged to move contact members which, in turn, regulate the energization of an auxiliary commutating field winding. By so adjusting the system that said contact members are in the open position when the resultant commutating field is of such value as to produce the desired current reversal in the short-circuited armature coils and by causing divergencies of the commutating field strength from said predetermined value in opposite directions to produce opposite effects upon the excitation, an automatic system is provided which is operable over wide ranges in the total armature reaction.

Furthermore, I may provide means whereby the resultant commutating field strength is permitted to rise as the load on the machine increases, thus permitting the production of a stronger reversing electromotive force for the heavier load current flowing in the armature circuit.

Still other features of my invention will be hereinafter more fully pointed out.

Referring to Fig. 1, I show a dynamo-electric machine at 5, such, for example, as a rotary converter, said machine including an armature 6 and a commutating pole 7 carried by a frame 8. Said frame 8 supports additional commutating poles and main field poles (not shown) suitable for the type of winding employed on the armature 6. The commutating pole 7 is provided with a main field winding 9 and with an auxiliary field winding 10. The armature 6 is provided with a commutator cylinder 11 and, if the dynamo-electric machine be a rotary converter, alternating current is supplied to said armature through suitable mains 12 and slip rings 13 and, after being converted into direct current, flows to load mains 14 and 15 through suitable brushes 16 bearing upon the commutator cylinder 11.

A booster machine 17, comprising an armature 18 and a field magnet 19, is shown mechanically and electrically associated with the main rotary converter 5 to produce boosting or bucking effects in proportion to the direction and magnitude of the excitation of the field magnet 19, such action being effected by any desired means, such, for example, as a reversing rheostat 20 interposed between the winding of a field magnet 19 and an exciting source 21.

Excitation of the commutating poles 7 of the rotary converter, in proportion to the load current, is produced by connecting the main commutating field winding 9 so as to be energized in accordance with the load, as, for example, by inserting said field winding in the main 14.

The auxiliary commutating field winding 10 is energized from a suitable source 22 and the amount of current flowing thereto is regulated by an adjustable resistor 23 under the control of a reversible rheostat motor 24 which, in turn, is under the control of a relay device 25. The relay device 25 may assume any one of a variety of forms but, in the specific form indicated, comprises a rod 26, mounted to permit oscillation and bearing a core member 27 and a movable contact member 28. Said contact member is arranged to coact with two fixed contact members 29 and 30 for the energization of the motor 24.

The core member 27 is mounted to be drawn toward the left by a solenoid 31 or other electro-responsive means energized in accordance with the electromotive force developed in a small auxiliary armature 32 mounted to rotate under the commutating pole 7 and being driven by any suitable means, such, for example, as a belt 33 operated from the shaft of the machine 5, as in the ordinary steam-engine governor. Motion of the core member 27 toward the left is resisted by a spring member 34 or other equivalent means, said spring preferably being adjustable in tension, as indicated at 35.

If desired, the rod 26 may be provided, in addition, with a core member 36 which may be drawn toward the right, in opposition to the effect of the solenoid 31, by a solenoid 37 that is energized in accordance with the load current of the rotary converter, as, for example, by being connected to the terminals of a current shunt 38. A still further desirable but non-essential feature of the system of Fig. 1 comprises a bell-crank lever 39 mounted to have its vertical arm oscillated by the armature 36 so that its horizontal arm will engage, or be disengaged from, a weight 40, as by a hook 41.

Having thus described the arrangement of the system shown in Fig. 1, the operation is as follows. Assume the rotary converter to be operating under normal conditions, with a net commutating field strength of, for example, 100 lines per square centimeter, under the commutating pole. The rotation of the armature member 32 in said desired commutating field produces just sufficient electromotive force and current flow in the solenoid 31 to draw the rod 26 against the action of the spring 34 so as to maintain the contact member 28 substantially midway between the fixed contact members 29 and 30. Under these conditions, the rheostat motor 24 is unenergized and the exciting current of the auxiliary compensating field winding 10 remains constant in value.

Assume now that the booster machine 17 is caused to boost, producing motor reaction in the armature, neutralizing a portion of the normal generator reaction under the brushes thereof, thus weakening the armature reaction. The excitation of the commutating pole 7 remaining substantially constant and the commutating pole magnetizing force necessarily preponderating over that of the armature in order to produce the desired net commutating field, the effect is to increase the flux in the commutating zone, increasing the electromotive force of the armature 32. As a result, the core member 27 is drawn to the left, producing engagement of the contact members 28 and 29 and operating the motor 24 to increase the effective resistance of the resistor 23, decreasing the excitation of the auxiliary field winding 10; producing, in turn, a reduction in the net commutating field and thus lowering the electromotive force of the armature 32 and the excitation of the solenoid 31. When the predetermined field strength of, for example, 100 lines per square centimeter is again attained, the energization of the solenoid 31 is decreased to such a value that the spring 34 exerts sufficient pull to draw the rod 26 to its mid position, deënergizing the motor 24.

Under bucking conditions, the converse action takes place. The motor operation of the booster machines drives the armature 6 as a generator, increasing the generator reaction under the brush and causing the magnetomotive force of armature reaction to approach that of the commutating pole, causing the net commutating field to fall below its desired value. The electromotive force of the armature 32, therefore, falls and the pull of the solenoid 31 is decreased to such an extent that the spring 34 draws the rod 26 to the right to effect contact between the members 28 and 30, whereby the motor 24 is caused to operate to eliminate resistance from the circuit of the winding 10. The energization of the auxiliary field winding 10 is thus increased to increase the magnetomotive force of the commutating pole proportionally to the magnetomotive force of the armature reaction. When the desired net field strength of, for example, 100 lines per centimeter, is again attained, the increasing energization of the solenoid 31 serves again to restore the rod 26 to its mid position.

It is frequently desirable that the reversing electromotive force produced by the net commutating field shall have a greater value under heavy loads than under light loads in order to obtain proper reversal of the load current flowing in the short-circuited armature coils. This result may be attained by the use of the solenoid 37 and its core member 36 which, by its pull, tends to aid the spring 34 and oppose the solenoid 31. Thus, under heavy-load conditions, with an increase of boost, the combined effect of the solenoid 37 and of the spring 34 is to draw the rod 26 to the right against the pull of the solenoid 31 at a greater value of net commutating flux than would be the case under light load and, in like manner, under bucking conditions, equilibrium is produced and maintained with a higher value of the net commutating flux under heavy-load conditions than under light-load conditions.

If desired, the spring 34 may be entirely eliminated or weakened to such an extent as to be effective merely to reduce chattering. Under these conditions, the control of the rod 26 is vested substantially entirely in the opposing forces of the solenoids 31 and 37, and extremely close regulation of the commutating field in accordance with the load current may be elected.

In systems of the general character herein described, there is a tendency to frequent oscillation because of over-sensitiveness. I may prevent this action by the bell-crank lever 39 and the weight 40. Let it be assumed that the permissible variation in the net commutating field strength is from 100 lines per square centimeter to 110 lines per square centimeter. Under these conditions, the adjustment is such that, with 100 lines per square centimeter, the electromotive force of the armature 32 is sufficient to draw the rod 26 to the left and to bring the horizontal member of the bell-crank lever 39 into engagement with the hook 41. Now assuming, for example, an increasing boosting effect so that the resultant commutating field tends to increase in value, there is no further movement of the rod 26 until the commutating field strength has attained the value of 110 lines per centimeter, at which time the pull upon the core 27 is sufficient to raise the weight 40 in addition to distending the spring 34. The converse operation takes place under conditions of buck, with a decrease in the commutating field strength.

Ordinarily, the armature reaction of a booster rotary converter never actually reverses except under conditions of maximum boost, coupled with light load and, under these conditions, the commutating problem is not serious. It is not ordinarily necessary, therefore, to provide for reversal of the commutating field flux but, if controlling apparatus responsive to such reversal is desired, it is preferable to provide the armature 32 with a commutator, as indicated Fig. 2, rather than to employ slip rings, as in the system of Fig. 1. Furthermore, the belt drive 33 of Fig. 1 may obviously be replaced by a motor drive 45, said motor preferably being substantially constant in speed, such, for example, as an induction motor operated from the alternating-current supply mains.

Instead of employing a differential relay, as in Fig. 1, I may employ a null relay for the control of the rheostat motor, as shown at 55 in Fig. 2. This relay has a polarized stator 56 and a moving coil 57 connected in circuit with the armature 32 and a current shunt 58. The electromotive force of the armature 32 opposes the drop of electromotive force across the shunt 58 and thus the energization of the coil 57 is proportional to the difference between said electromotive forces, both in magnitude and in sign. The coil 57 operates a contact member 28, as in Fig. 1.

Turning now to features of the auxiliary armature employed, attention is directed to Figs. 3 and 4. In modern rotary converters, the air gap under the interpoles or commutating poles is comparatively large, having values of an inch or more. It is, therefore, entirely possible to mount a suitable armature 32 between the commutating pole 7 and the armature 6, as indicated in Fig. 3. It is desirable to disturb the magnetic distribution as little as possible and I, therefore, preferably construct the core of the armature 32 of non-conducting non-magnetic material, such, for example, as bakelized micarta. Non-magnetic material, such, for example, as brass, would be preferable to iron for the core member but would seriously affect the magnetic distribution because of the magnetic effects of eddy currents. A shuttle winding 46 is applied to the core member thus provided but as small an amount of energy as possible should be drawn from said winding for the energization of the solenoid 31 in order to minimize the magnetic effect of the armature reaction of the small auxiliary armature.

The auxiliary armature may be supported in any suitable manner, as, for example, by brackets 47 shown in Figs. 1 and 2, said brackets being attached to the commutating pole. Since the air currents produced at the surface of the main armature might deposit sufficient dust and dirt upon the small auxiliary armature to eventually clog the same, the latter may be entirely inclosed, as, for example, by a micarta cover 48.

When applying my invention to a machine having an air gap under the commutating pole that is too small for the introduction of the necessary armature, I may employ the construction shown in Fig. 4. A special commutating pole 49 is provided, said pole having a portion of its tip cut away, as shown at 50, the outline of the remaining commutating poles being indicated by dotted lines 51. In order to restore the reluctance of the magnetic path of the commutating pole 49 to the value it would have were the tip of said pole not cut away, the core member of the armature 32 is preferably made of iron. Care should be taken to insure that the amount of iron removed from the pole piece is replaced by an equivalent amount of iron in the armature in order that the commutating conditions under the regulating commutating pole may be the same as those under the remaining commutating poles.

I have shown my invention applied to a single interpole but, in practice, it will be understood that the regulating electromotive force obtained from an auxiliary armature under one interpole may be employed to regulate the field strength of all of the commutating poles ordinarily employed in a dynamo-electro machine. Obviously, if desired, a greater number of auxiliary armatures may be employed.

Although I have shown and described my invention in a plurality of forms, it is not limited to such forms but is susceptible of various changes within the scope of the appended claims.

I claim as my invention:

1. The combination with a dynamo-electric machine of the commutator type provided with a commutating pole, of exciting means for said pole, and means independent of the armature winding of said machine for regulating the excitation of said commutating pole in accordance with the actual commutating field strength.

2. The combination with a dynamo-electric machine of the commutator type provided with a commutating pole, of exciting means for said pole, means subject to the control of the flux under said commutating pole for regulating the excitation of said commutating pole, and means responsive to load conditions in said dynamo-electric machine for varying the sensitiveness of said flux-controlling means under heavy-load conditions.

3. The combination with a dynamo-electric machine of the commutator type provided with a commutating pole, of exciting means for said pole, means subject to the control of the flux under said commutating pole for regulating the excitation of said commutating pole, and means responsive to load conditions in said dynamo-electric machine for decreasing the sensitiveness of said flux-controlling means under heavy-load conditions from the value obtaining under light-load conditions.

4. The combination with a dynamo-electric machine of the commutating type provided with two windings disposed in operative relation to a commutating zone, of means for energizing one of said windings in accordance with the load current of said machine, and means for energizing the other of said windings, and means responsive to the divergence of the net commutating field from a predetermined value for controlling the latter energizing means for restoring the strength of said commutating field to said predetermined value.

5. The combination with a dynamo-electric machine of the commutating type provided with two windings disposed in operative relation to a commutating zone, of means for energizing one of said windings in accordance with the load current of said machine, and means for energizing the other of said windings, and means responsive to the divergence of the net commutating field from a predetermined value for controlling the latter energizing means for restoring the strength of said commutating field to said predetermined value, said last named means including means for varying said predetermined value with the load on said dynamo-electric machine.

6. The combination with a dynamo-electric machine of the commutating type provided with an exciting winding in operative relation to a commutating zone, of an auxiliary armature mounted to rotate in the commutating field of a commutating zone, driving means for said armature, and means whereby the electromotive force produced in said armature is employed to regulate the energization of said exciting winding to adjust the magnetic field in said first named commutating zone.

7. The combination with a dynamo-electric machine of the commutating type provided with an exciting winding in operative relation to a commutating zone, of an auxiliary armature mounted to rotate in the commutating field of said commutating zone, driving means for said armature, and means whereby the electromotive force produced in said armature is employed to regulate the energization of said exciting winding to adjust the magnetic field in said commutating zone.

8. The combination with a dynamo-electric machine of the commutating type provided with two exciting windings in operative relation to a commutating zone, of means for energizing one of said windings in proportion to the load current of said dynamo-electric machine in such direction and amount as to partially neutralize the magnetomotive force of armature reaction under varying conditions of load, and means dependent upon the divergence of the field strength in said commutating zone from a predetermined value to energize the other of said exciting windings to restore said predetermined field strength, said last named means including means responsive to the load current of said dynamo-electric machine, whereby said predetermined field strength varies with the load.

9. The combination with a dynamo-electric machine of the commutating type provided with two exciting windings in operative relation to a commutating zone, of means for energizing one of said windings in proportion to the load current of said dynamo-electric machine in such direction and amount as to partially neutralize the magnetomotive force of armature reaction under varying conditions of load, energizing means for the other of said windings, an auxiliary armature mounted in said commutating zone, driving means for said armature, and means whereby the electromotive force of said armature is employed to so regulate the energization of said other exciting winding as to produce a predetermined commutating field strength in said commutating zone.

10. The combination with a dynamo-electric machine of the commutating type provided with two exciting windings in operative relation to a commutating zone, of means for energizing one of said windings in proportion to the load current of said dynamo-electric machine in such direction and amount as to partially neutralize the magnetomotive force of armature reaction under varying conditions of load, energizing means for the other of said windings, an auxiliary armature mounted in said commutating zone, driving means for said armature, means whereby the electromotive force of said armature is employed to so regulate the energization of said other exciting winding as to produce a predetermined commutating field strength in said commutating zone, and means whereby said predetermined commutating field strength is varied with different load currents flowing in the armature winding of said dynamo-electric machine.

11. The combination with a dynamo-electric machine of the commutating type provided with an exciting winding in operative relation to a commutating zone, of energizing means for said exciting winding, an auxiliary armature mounted to rotate in said commutating zone, driving means for said armature, a motor element, connections whereby the electromotive force developed by said auxiliary armature energizes said motor element to produce an operating force, energy storing and restoring means producing an additional operating force, means for combining said forces, and means whereby the resultant force operates to regulate the energization of said exciting winding.

12. The combination with a dynamo-electric machine of the commutating type provided with an exciting winding in operative relation to a commutating zone, of energizing means for said exciting winding, an auxiliary armature mounted to rotate in said commutating zone, driving means for said armature, spring means, a relay device comprising an electro-responsive member operable to move a movably mounted member in opposition to said spring means, contact members arranged to be operated by said movable member, connections whereby electrical energy developed in said auxiliary armature is caused to energize said electro-responsive means, and connections whereby the coaction of said contact members regulates the energization of said exciting field winding.

13. The combination with a dynamo-electric machine of the commutating type provided with an exciting winding in operative relation to a commutating zone, of energizing means for said exciting winding, an electro-responsive motor element operated in accordance with the load current of said dynamo-electric machine, an auxiliary armature mounted to rotate in said commutating zone, driving means for said armature, spring means, a relay device comprising an electro-responsive member operable to move a movably mounted contact member for the control of said energizing means in opposition to said spring means and also in opposition to said electro-responsive motor element.

14. The combination with a dynamo-electric machine of the commutating type provided with en exciting winding in operative relation to a commutating zone, of energizing means for said exciting winding, an auxiliary armature mounted to rotate in said commutating zone, driving means for said armature, spring means, a relay device comprising an electro-responsive member operable to move a movably mounted contact member in opposition to said spring means for the control of said energizing means and means for preventing movement of said movably mounted member during a predetermined range of field-strength variation in said commutating zone.

In testimony whereof I have hereunto subscribed my name this 31st day of Jan., 1918.

DAVID C. DAVIS.

---

It is hereby certified that in Letters Patent No. 1,357,227, granted November 2, 1920, upon the application of David C. Davis, of Wilkinsburg, Pennsylvania, for an improvement in "Exciting Systems for Commutating-Poles in Dynamo-Electric Machinery," errors appear in the printed specification requiring correction as follows: Page 3, line 81, for the word "elected" read *effected;* line 118, after the word "indicated" insert the word *in;* and that the said Letters Patent should be read with these corrections therein that the same may conform to the record of the case in the Patent Office.

Signed and sealed this 25th day of January, A. D., 1921.

[SEAL.]

L. B. MANN,

*Acting Commissioner of Patents.*

Cl. 171—123.